INVENTORS
JAMES R. CURRIE
HARRY REID, JR.

ATTORNEYS

INVENTORS
JAMES R. CURRIE
HARRY REID, JR.

ATTORNEYS

INVENTORS
JAMES R. CURRIE
HARRY REID, JR.
ATTORNEYS

INVENTORS
JAMES R. CURRIE
HARRY REID, JR.

BY

ATTORNEYS

# United States Patent Office 3,487,288
Patented Dec. 30, 1969

3,487,288
PULSE WIDTH INVERTER
Harry Reid, Jr., and James R. Currie, Huntsville, Ala., assignors to the United States of America as represented by the Administrator of the National Aeronautics and Space Administration
Filed Jan. 25, 1968, Ser. No. 700,541
Int. Cl. H02m 1/12
U.S. Cl. 321—9                           6 Claims

ABSTRACT OF THE DISCLOSURE

An apparatus for converting DC to AC voltage by utilizing varying pulse widths. All of the pulses are so arranged so that when filtered a sine wave output is obtained. A polyphase system can be created by using a combination of two pulse trains for each phase desired with all pulses being generated by the same clock circuit and arranged by a selector device.

BACKGROUND OF THE INVENTION

The invention described herein was made by employees of the United States Government and may be manufactured and used by or for the Government for governmental purposes without the payment of any royalties thereon or therefor.

Field of the invention

This invention relates to an apparatus for converting DC voltage to AC voltage and more specifically to an apparatus for voltage conversion using controlled pulse widths and pulse arrangements to generate an AC output voltage.

Description of the prior art

As space travel develops, not only are substantial improvements required in vehicle engine design and fabrication, but similar advances must be made in on-board electronic equipment. Because everything on-board the space vehicle is normally operated from battery supplies, a system converts the DC voltage to an AC voltage. This AC voltage is needed in the guidance system to drive gyro wheels and associated electronic equipment. As is the case with all on-board space equipment, the conversion device or system must meet the requirements of a minimum possible weight and size, and a maximum reliability and efficiency.

Heretofore, there has been no inverter-rotary, analog, or pulse amplitude—that can meet all of the above requirements. The rotary inverter is fairly efficient but due to the bearing lubricants and slip rings the reliability in outer space is questionable. On the other hand, the analog solid state inverter using class A or B amplifier can be made reliable, but due to low efficiency, considerable weight must be sustained to heat sink the package. The pulse amplitude inverter is more efficient and reliable than rotary inverters but contains a large number of transformers that will increase the size and weight of the package.

In the normal DC to AC pulse amplitude power converters, the input voltage is chopped by a transistor-transformer combination to give a series of bidirectional pulses of the proper amplitudes. These pulses have a constant duty cycle and an amplitude proportional to the input voltage. Filtering operation smooths out the proper combination of pulses to give a sine wave voltage function.

With an ideal solid state inverter which eliminates transformers, inductors and capacitors, an efficient frequency source can be created. One reason why pulse width techniques could not have been developed before was because the transistors did not have the fast transition time necessary. With new developments in transistors, it was possible to create a pulse width modulator for transferring large amounts of power from a source to a load with essentially no losses in the amplifier. Since the power dissipation in the amplifier is small, the various techniques of miniaturization, such as thin films and monolithic integrated circuits, can be applied. More significant than the reduction in size and weight is the increase in reliability which is being achieved through the use of microcircuits.

A conventional amplitude modulated DC amplifier applies a voltage to the load proportional to the torque demanded by the system with the remainder of the supply voltage being dropped across the amplifiers. Because efficiency for any signal level is $E$ load/$E$ maximum, the efficiency approaches zero as the system approaches a null. This problem can be solved with pulse width modulation, not only in amplifiers, but also in inverters because the full supply voltage is applied to the load in the form of a pulse train of a frequency sufficiently higher than the mechanical and electrical time constants in the system. The properly arranged pulses can then be filtered to give a smooth AC voltage output.

SUMMARY OF THE INVENTION

Accordingly, it is the object of this invention to provide an apparatus for converting DC voltage to AC voltage by utilizing pulse width modulation techniques.

It is a further object of the invention to provide an apparatus for converting DC voltage to AC voltage which is more reliable and efficient than previous methods, and which reduces the weight and size.

A still further object of this invention is to provide an apparatus for producing polyphase voltages from a DC supply utilizing pulse width modulation techniques.

These and other objects are accomplished in the present invention in which separate high gain amplifiers operate from the voltage differential between a triangular wave and separate outputs of a voltage divider network. Each high gain amplifier produces one pulse of a given width, then a selector system arranges the pulses into two pulse trains per phase output desired. The pulse trains are so arranged that, when combined through a special switch and filtered, a sine wave out is obtained. Polyphase systems can be formed by using the proper selection of pulses in arranging the two pulse trains per phase to generate the proper angle between phases. The pulse width inverter was designed primarily for space vehicles, but there are applications for commercial use because of the high reliability, efficiency, and reduction in size. The present invention is more economical because of the miniaturization of components and mass production.

BRIEF DESCRIPTION OF THE DRAWINGS

The invention herein disclosed will be more fully understood when taken together with the accompanying drawings in which.

DESCRIPTION OF THE PREFERRED EMBODIMENTS

Figure 1:
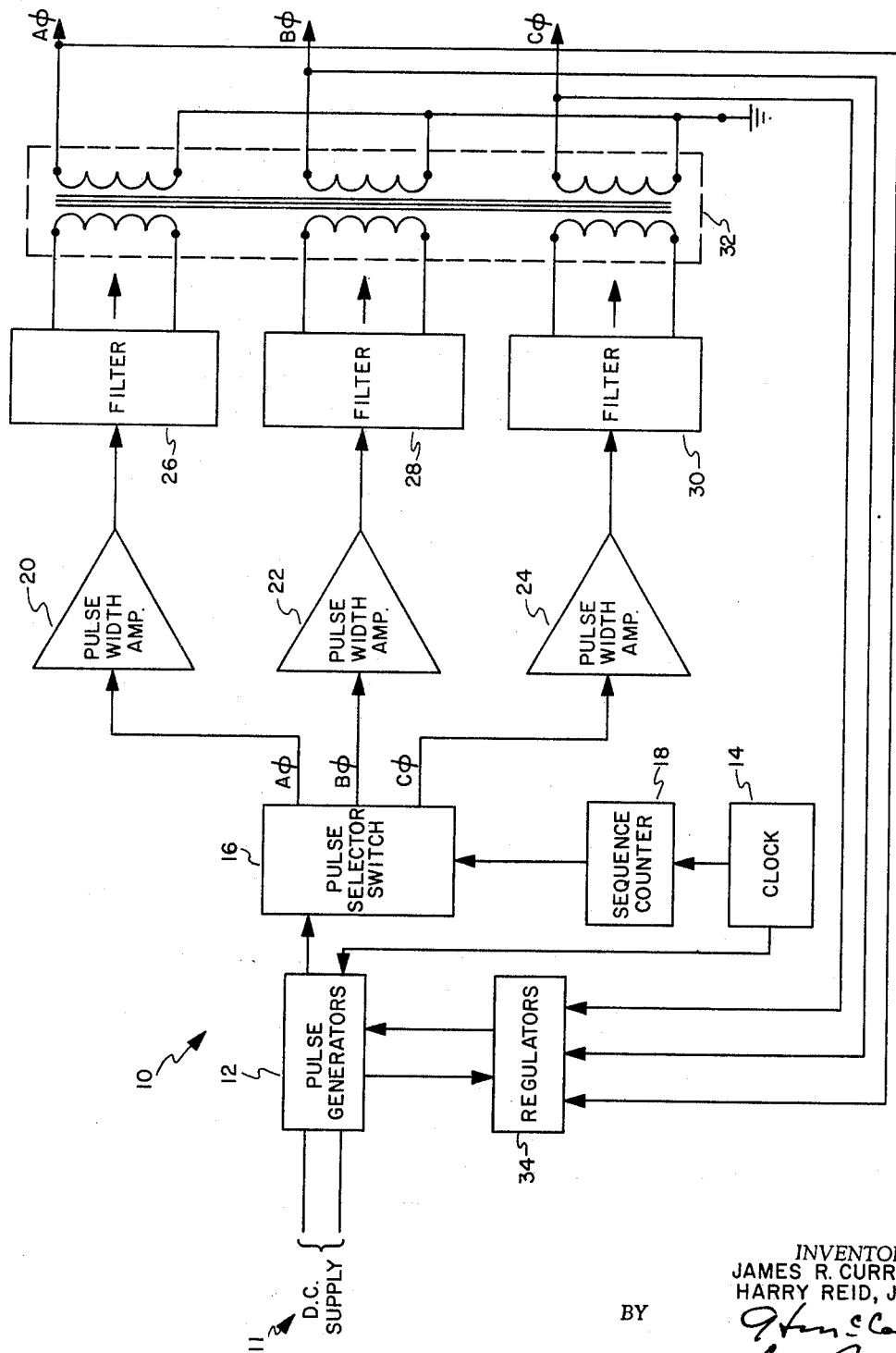
FIGURE 1 is an illustrative block diagram that shows the normal signal flow in a 3 phase converter version of the present invention.

With continued reference to the accompanying figures, and with initial attention directed to FIGURE 1, reference number 10 generally designates an illustrative embodiment of an inverter used to convert DC voltage source to AC voltage. A general presentation will be given first with more detail on certain parts thereafter.

From the DC voltage source 11, pulse width generators 12 create a pulsed DC voltage. The pulse generators 12 are composed of six operational amplifiers with each amplifier having a differential input and functioning in this application as a crossover detector. Each of the amplifiers produces a different width pulse as will be explained in more detail hereinafter. All six amplifiers are timed by a clock circuit 14 that controls the differential input voltage so there is an output from each amplifier during a given time period. Through a pulse selector switch 16, the proper combination of pulses is selected to give the pulse trains illustrated in FIGURE 2, namely, phases A, B, and C, with each phase being represented by two pulse trains. Timing for the pulse selector switch 16 is controlled by a sequence counter 18 that is operated by the same clock 14 that controls the pulse generator's differential voltage input. The sequence counter 18 is looped on itself so that it counts through the desired number of clock times per wavelength (in this case, 24), resets itself, and counts again, very similar to a ring counter. Therefore, all control circuits are operated by the same clock 14.

The two pulse trains that compose a phase are fed into a pulse width amplifier 20, 22, or 24 with one train forming Input #1 and the other train forming Input #2. More details will be shown later, but essentially the two inputs operate across a bridge network with one input being inverted to give an output as illustrated by pulse width amplifier output A in FIGURE 2. This same procedure operates to obtain any desired number of output phases, each phase being produced by a separate pulse width amplifier.

Outputs from the pulse width amplifier 20, 22, or 24 are shaped into a sine wave by filtering out the undesired harmonics. Extremely low distortion of the filter 26, 28, or 30 is desired with a maximum phase shift difference between filters of one degree. If the system is used to drive gyro wheels, though it could be used in many other ways, the low distortion will result in less heat to the gyro wheels. A polyphase output can be obtained from the output of the filters, but the output is a voltage differential and above chassis ground. In systems that do not require isolation nor need a floating ground, and do not need an increase in voltage, the output can be taken directly from the filters 26, 28, and 30. However, in most 3 phase systems as shown in FIGURE 1, isolation is required, a specific voltage is needed, and a ground reference is essential. Therefore, an output transformer 32 should be used.

The inverter 10 has two types of regulator circuits 34, sine wave output regulation and DC current input regulation. Loop controls for the sine wave output regulate the DC bias to the pulse generator 12. (Here again, pulse width techniques incorporating DC ripple feedback are used to regulate the AC inverter output to within ½ percent for normal supply voltage variation; i.e., 24 to 32 volts DC.) Matched resistors and diodes could help in regulation against temperature variations. A current regulator will prevent the pulse width amplifiers 20, 22, and 24 from being damaged in case the inverter output is shorted.

Figure 3:
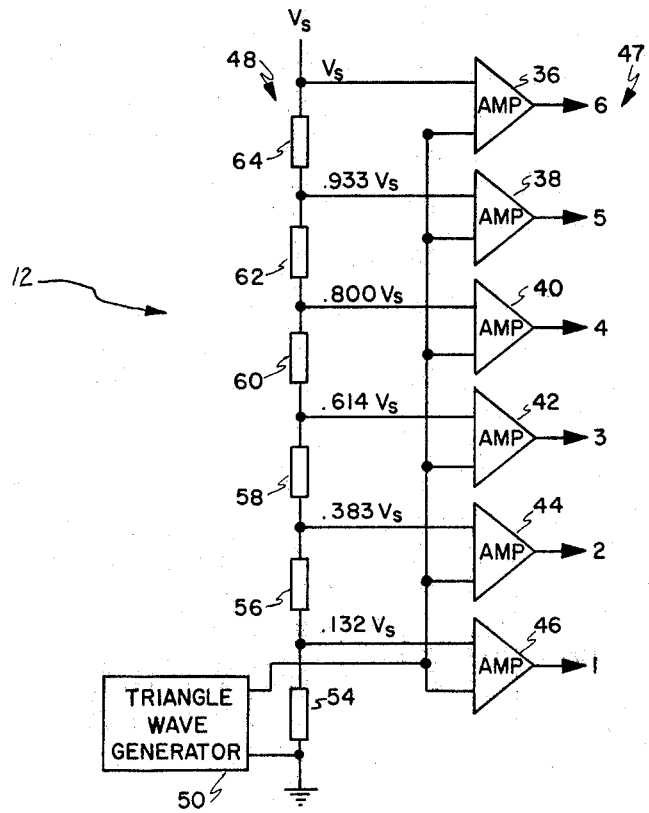
FIGURE 3 is a diagrammatic circuit diagram of the pulse generators in FIGURE 1.
Figure 4:
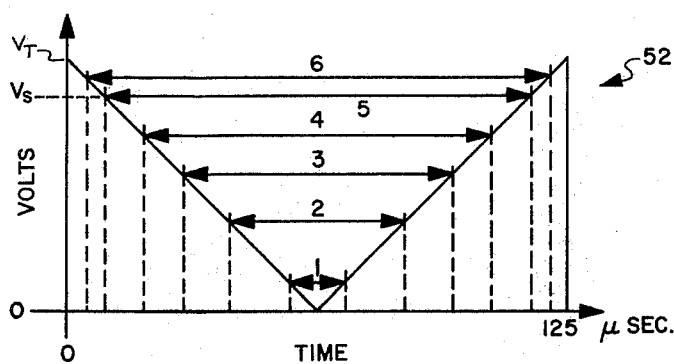
FIGURE 4 is a representative output of the triangle wave generator of FIGURE 3 with the broken lines illustrating the length of time the different generators are on and at what voltage level they trigger.

Returning to the pulse generators 12, each amplifier 36, 38, 40, 42, 44, and 46 in FIGURE 3 is extremely high gain. Using a microampere 709 operational amplifier (manufactured by Fairchild Semiconductor) as an example, this high gain can be utilized with an amplifier changing state from full off to full on with an input differential of less than 0.5 millivolt. The amplifier's rise and fall times are each about .063 microsecond. Input voltages for the microampere 709 operational amplifiers 47 are obtained from a voltage divider network 48 in FIGURE 3 and from a triangular wave generator 50 that has an output 52 illustrated in FIGURE 4. Referring back to FIGURE 3, the triangular wave generator output 53 is connected to one side of each operational amplifier 36, 38, 40, 42, 44, and 46, and the opposite side of each operational amplifier 36, 38, 40, 42, 44, and 46 is connected to a different point on a voltage divider 48. The voltage divider 48 is formed from a series of resistors 54, 56, 58, 60, 62, and 64 as shown with the maximum voltage $V_s$ being the DC voltage supplied to the divider network 48. Therefore, each operational amplifier 36, 38, 40, 42, 44, and 46 is turned on when the triangle wave generator voltage 52 is less than the voltage received from the voltage divider network 48 and is turned off when the triangle wave generator voltage 52 is more than the voltage received from the voltage divider network 48. On-time for the different amplifiers 47 can be seen in FIGURE 4 with each pulse width being represented by the numbers 1, 2, 3, 4, 5, and 6. However, when all amplifiers 47 are on, the voltage outputs are of the same magnitude $V_s$. Note that the triangular wave voltage 52 is slightly higher than the DC voltage $V_s$, and that each operational amplifier 36, 38, 40, 42, 44, and 46 receives one input from the voltage divider network 48 with the other input being proportional to $V_s$.

The pulse width ($P_w$) can be calculated by an equation $$P_w = K \frac{(\text{sine } A + \text{sine } B)}{2}$$

where A is the angle at the start of the time increment, B is the angle at the end of the time increment, and K is a regulating constant that is the same for all pulses at any one instant of time. The angle is with reference to the desired AC output signal and the time increment is the length of time the pulse is on. For a sine wave, the following pulse widths will be obtained:

| Pulse: | Pulse width, $V_s/V_t$ |
|---|---|
| 1 | .132 |
| 2 | .383 |
| 3 | .614 |
| 4 | .800 |
| 5 | .933 |
| 6 | 1.000 | where $K = V_s/.983$ and $V_t$ is peak-to-peak amplitude of the triangular wave.

Figure 2:
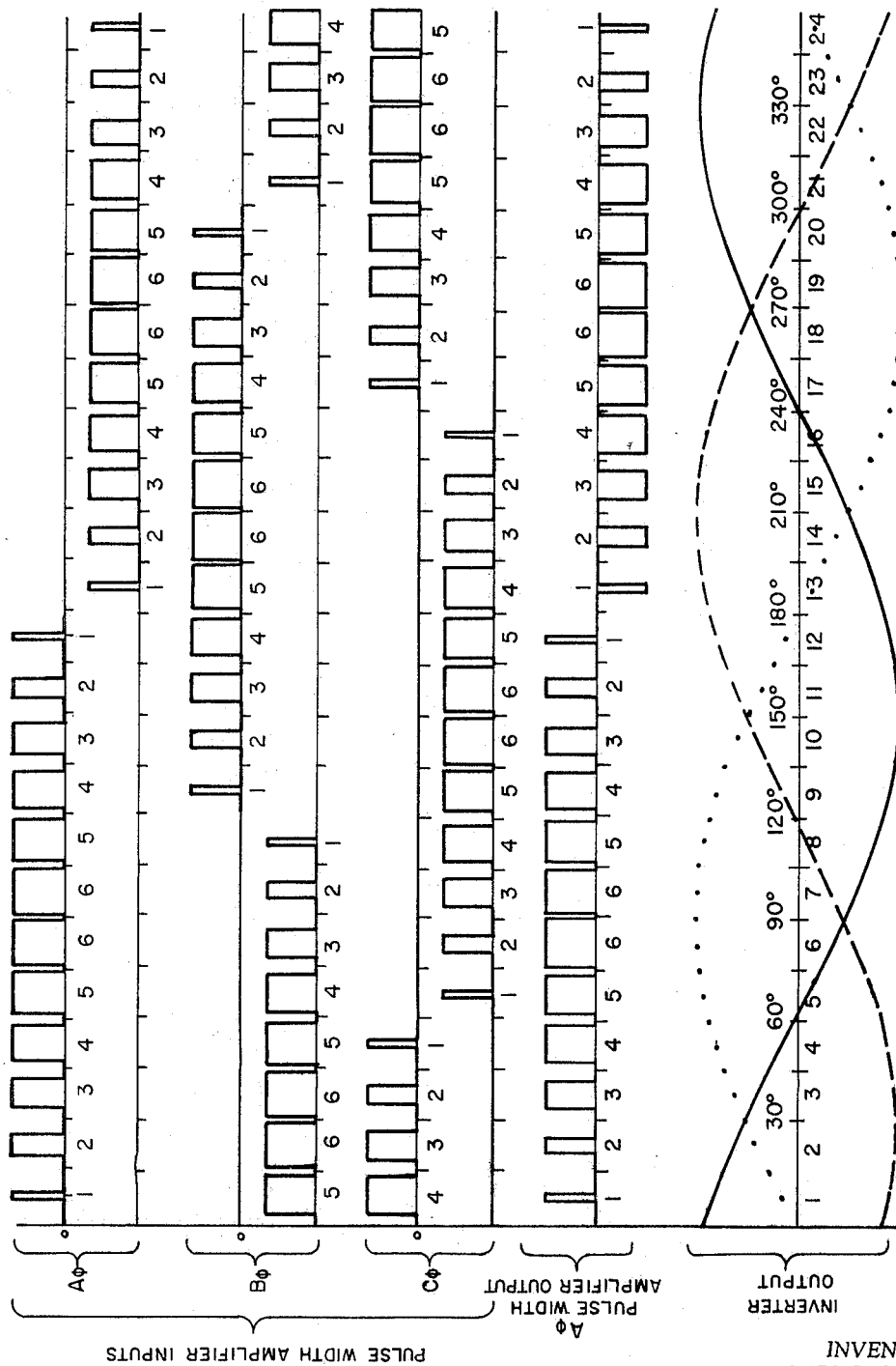
FIGURE 2 is a representation of the different pulse trains utilized in the invention to formulate the output of a 3 phase converter illustrated in FIGURE 1.
Figure 5:
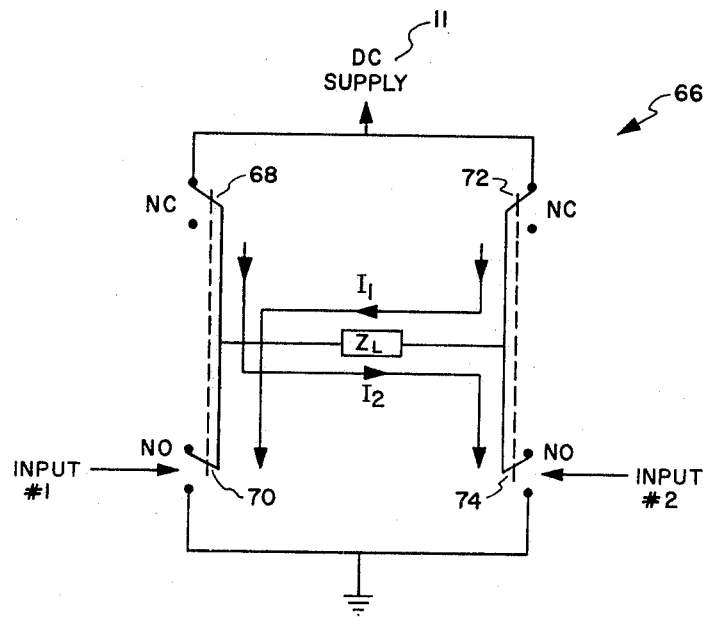
FIGURE 5 shows a simplified switch exemplification of the pulse width amplifier in FIGURE 1 with the output developed across $Z_L$.
Figure 6:
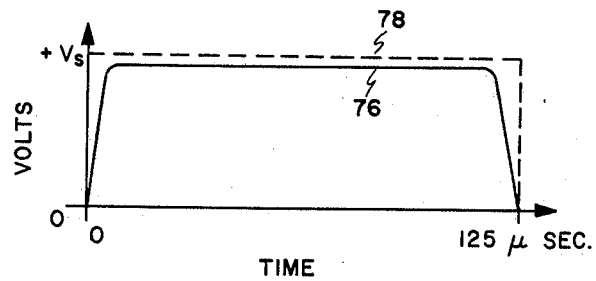
FIGURE 6 is a theoretical output of an ideal pulse width amplifier and the actual output to illustrate efficiency.

To explain the pulse width amplifiers 20, 22, and 24 refer to FIGURE 5 where a pictorial diagram 66 of the circuit functions is shown. Switches 68 and 70 are controlled by Input #1 and switches 72 and 74 are controlled by Input #2. When no input is present, switches 68 and 72 tie the load $Z_L$ to the positive side of the supply 11 while switches 70 and 74 remain open which prevents current drainage during null. When a signal is applied only to Input #1, switch 68 opens while switch 70 closes and the current $I_1$ can then pass from the positive side of the supply through switch 72, the load $Z_L$, and switch 70 to ground. Removing the signal from Input #1 and applying it to Input #2 will allow the current $I_2$ to flow from the positive side of the supply through switch 68, the load $Z_L$, and switch 74 to ground. Since the currents $I_1$ and $I_2$ are in the opposite directions, reverse voltages will be developed across $Z_L$ for the different pulse trains as shown in FIGURE 2, output A. FIGURE 6 shows the efficiency of this switch 66 with the area under the curve 76 representing the voltage developed at the load $Z_L$, and the area under the dashed line 78 representing the theorical voltage to be developed at the load $Z_L$.

The number of pulse width generators 12 used to obtain an AC output is not limited to the six suggested herein, but can be any number of pulse widths to give smooth sine wave output. The possible range of frequencies at the present stage of solid state development is from 10 to 1000 c.p.s., but with the present rate of developments in the solid state field, 10,000 c.p.s. can soon be reached and passed. To change frequencies, all that will have to be changed, other than the clock 14, is the output filters 26, 28 and 30 wherein the bandpass will correspond to the desired frequency output.

From the foregoing it may be seen that the applicants have invented a novel apparatus for carrying out the conversion. The invention 10 generates an AC signal by varying the pulse width of a pulsed DC supply, with almost the entire voltage developed being dropped across the load $Z_L$ and very little in the switching circuits 12, 16, and 66. When the pulse is off, then the supply 11 sees a high impedance load and almost no current is drawn. Because there is almost no power loss in the switching, the inverter 10 can be used in an environment where size and weight are important and still maintain very high reliability.

What is claimed is:

1. An apparatus for converting DC voltage to AC voltage by pulse width modulation comprising:
    (a) a DC power source;
    (b) a modulating means to simultaneously generate pulses of varying widths from said DC power source, said modulating means comprising:
        (1) a triangular wave generator;
        (2) a voltage divider network electrically connected between said DC voltage supply and ground;
        (3) high gain amplifiers to generate said pulses, each said high gain amplifier generating a pulse of different width with said width being determined by a difference between inputs from said triangular wave generator and said voltage divider network;
    (c) combining means electrically connected to said modulating means, said combining means arranging pulses into a given bidirectional pulse train;
    (d) a filtering means that receives said pulse train to remove undesired harmonics to yield an AC voltage output.

2. An apparatus for converting DC voltage to AC voltage by pulse width modulation comprising:
    (a) a DC power source;
    (b) a modulating means to simultaneously generate pulses of varying widths from said DC power source;
    (c) a combining means electrically connected to said modulating means, said combining means arranging pulses into a given bidirectional pulse train, said combining means comprising:
        (1) a selector means to choose said pulses from said modulating means in a given order in forming two pulse trains;
        (2) inverting means to invert one of said two pulse trains from said selector means and simultaneously combine with the other one of said two pulse trains to form said bidirectional pulse train;
    (d) a filtering means that receives said pulse train to remove undesired harmonics to yield an AC voltage output;
    (e) an isolating means electrically connected to said filtering means, therefore isolating said AC voltage output from ground;
    (f) a clocking means, said clocking means controlling both said selector means and said modulating means through timed input signals, said signals to said selector means from said clocking means operating through a sequence counter.

3. The apparatus for converting DC voltage to AC voltage as set forth in claim 2 further comprising regulation means interconnected with said modulating means, said filtering means, and said combining means; said regulation means regulating said AC voltage output and DC current input.

4. An inverter for converting DC voltage to a polyphase AC voltage by pulse width modulating techniques comprising:
    (a) a DC voltage supply;
    (b) a generating means for creating pulses of different widths from said DC voltage supply;
    (c) a selector means for arranging into a particular order from said pulses two pulse trains per phase output desired of said inverter;
    (d) a separate combining means for each said phase output, said combining means forming said two pulse trains per phase into a bidirectional pulse train;
    (e) a filtering means for each said phase output to eliminate unwanted harmonics from said bidirectional pulse train to yield said polyphase AC voltage;
    (f) an isolating means electrically connected to said filtering means, said isolating means protecting said polyphase AC voltage from ground;
    (g) a clocking means electrically connected to and controlling said selector means and said generating means.

5. The invention for converting DC voltage to a polyphase AC voltage as set forth in claim 4 wherein said generating means further comprises:
    (a) a triangular wave generating means;
    (b) a voltage divider network connected to said DC voltage supply;
    (c) high gain differential amplifiers for each pulse width desired with differential input voltage obtained between said triangular wave generating means and said voltage divider network.

6. An inverter for converting DC voltage to a polyphase AC voltage by pulse width modulating techniques comprising:
    (a) a DC voltage supply;
    (b) a generating means for creating pulses of different widths from said DC voltage supply;
    (c) a selector means for arranging into a particular order from said pulses two pulse trains per phase output desired of said inverter;
    (d) a separate combining means for each said phase output, said combining means forming said two pulse trains per phase into a bidirectional pulse train;
    (e) a filtering means for each said pulse output to eliminate unwanted harmonics from said bidirectional pulse train to yield said polyphase AC voltage;
    (f) an isolating means electrically connected to said filtering means, said isolating means protecting said polyphase AC voltage from ground;
    (g) regulating means wherein one part of said regulating means controls the DC current flow and another part of said regulating means controls the amplitude of said polyphase AC voltage, said regulating means being an electrically interconnecting loop between said polyphase AC voltage and DC voltage supply.

References Cited

UNITED STATES PATENTS

| | | | |
|---|---|---|---|
| 3,310,730 | 3/1967 | Ruch | 321—18 |
| 3,376,490 | 4/1968 | Osugi | 321—5 |

LEE T. HIX, Primary Examiner

W. M. SHOOP, JR., Assistant Examiner